Feb. 14, 1950  A. G. HERRMANN  2,497,606
MICROFILM VIEWER AND PROJECTING APPARATUS
WITH MASKING AND SELECTING MEANS
Filed Oct. 18, 1945  4 Sheets-Sheet 1

INVENTOR
*Alvin G. Herrmann*
BY
*J. G. Bassiches*
ATTORNEY

Feb. 14, 1950     A. G. HERRMANN     2,497,606
MICROFILM VIEWER AND PROJECTING APPARATUS
WITH MASKING AND SELECTING MEANS
Filed Oct. 18, 1945                            4 Sheets-Sheet 2
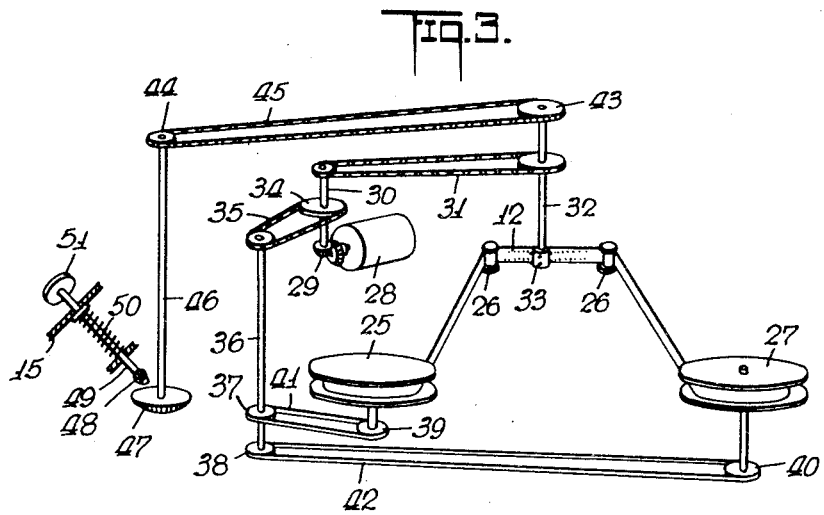
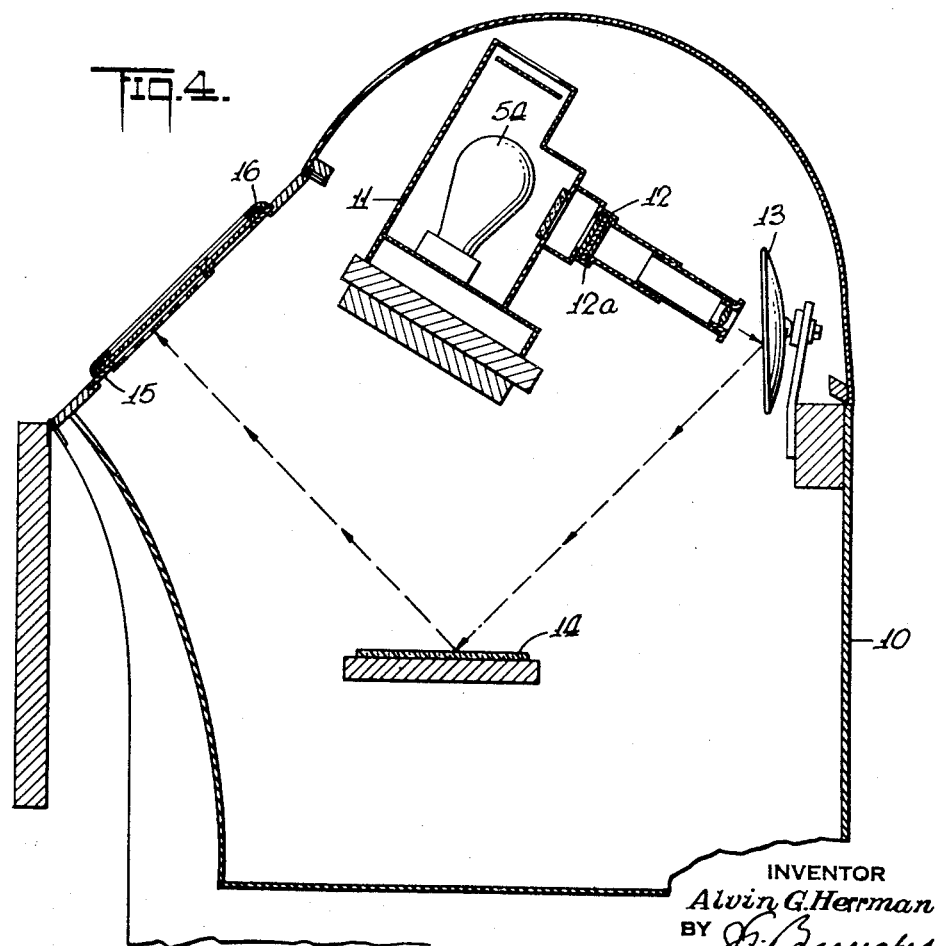
INVENTOR
Alvin G. Herrmann
BY
his ATTORNEY

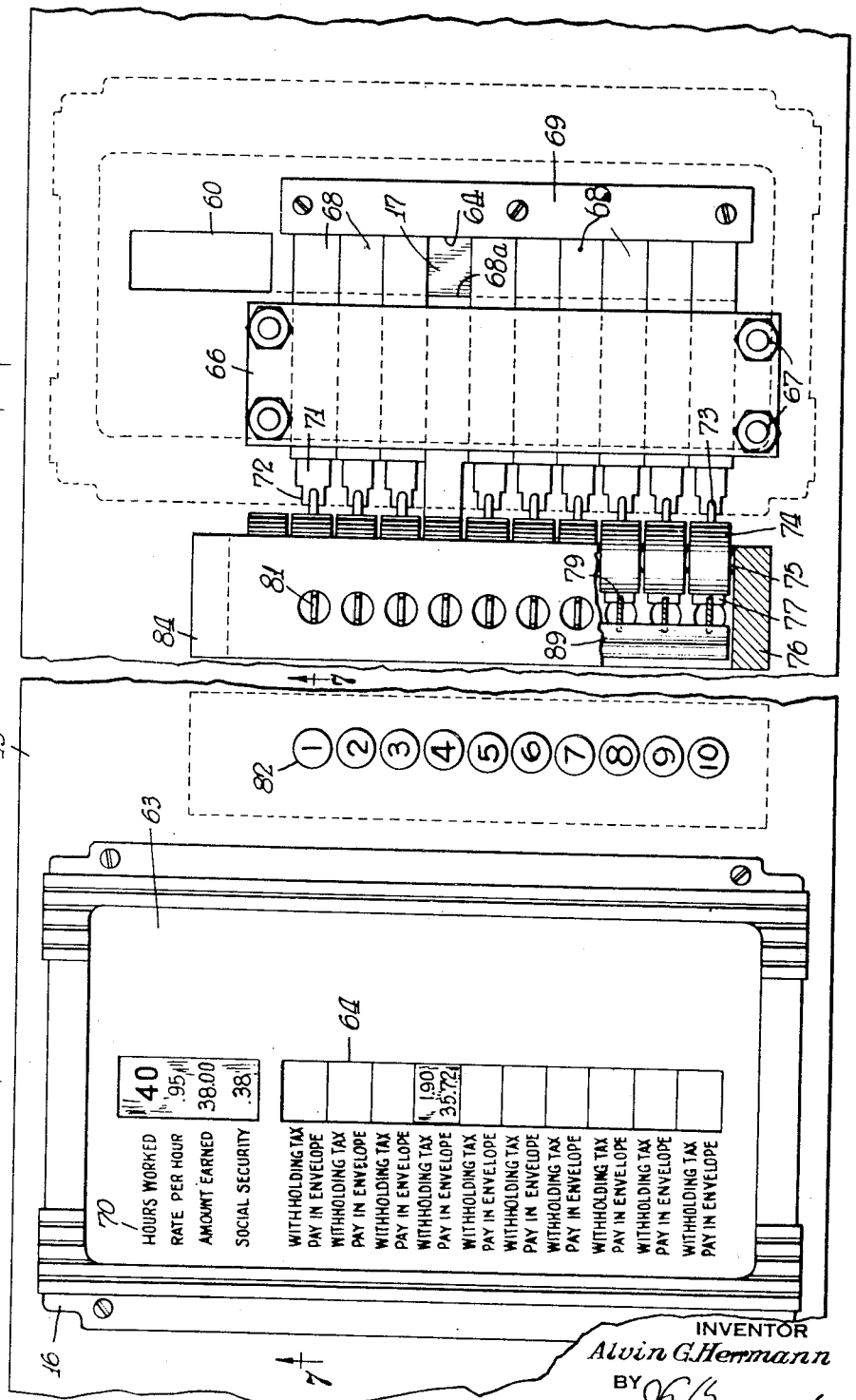

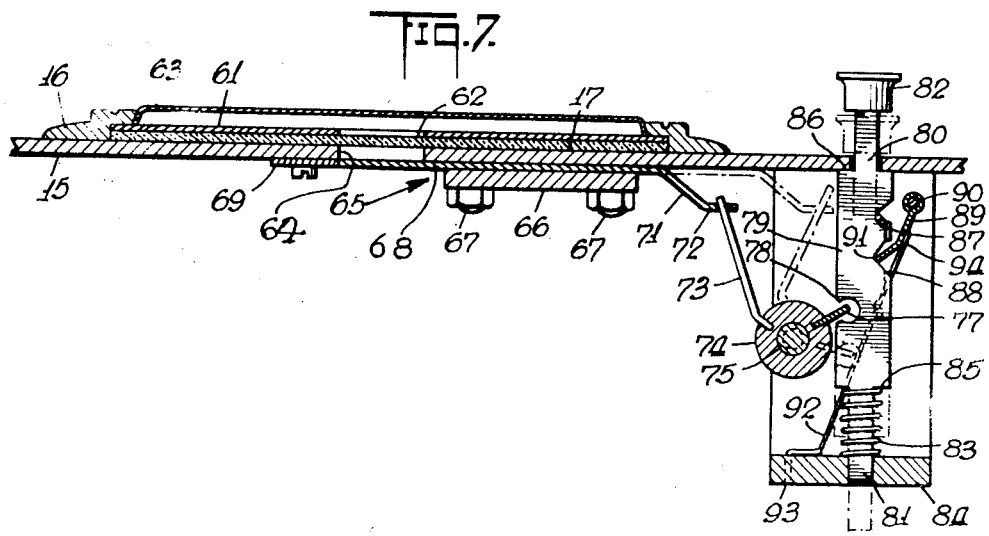
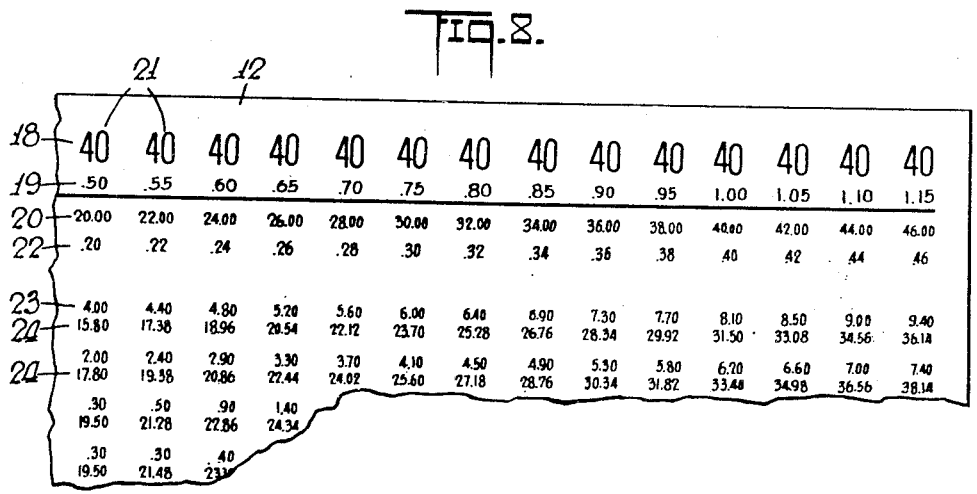
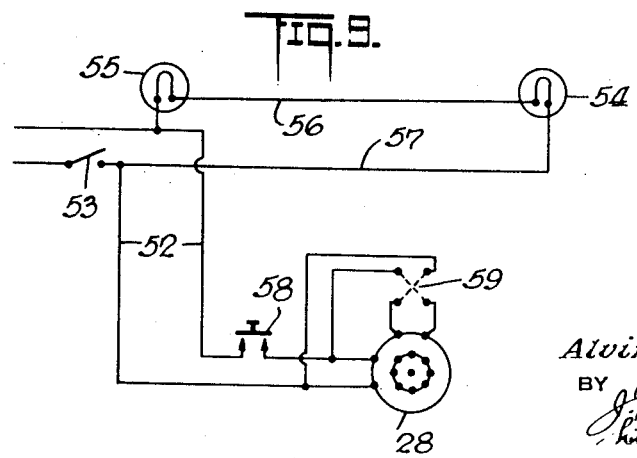

Patented Feb. 14, 1950

2,497,606

UNITED STATES PATENT OFFICE 2,497,606

MICROFILM VIEWER AND PROJECTING APPARATUS WITH MASKING AND SELECTING MEANS

Alvin G. Herrmann, Freeport, N. Y., assignor to Herbert D. Adler & Company, New York, N. Y., a partnership Application October 18, 1945, Serial No. 623,137

5 Claims. (Cl. 88—24)

This invention relates to a viewing device for microfilm; more particularly to a device for viewing tabularized data which is recorded on microfilm, and still more particularly to a business machine wherein data is recorded on microfilm whereby economies may be effected in space and to provide the ready inspection of such data so recorded on the microfilm.

Known to me is the expedient of effecting economy in space of graphic matter and records by the reproduction of the same upon microfilm.

The transfer of details from tabularized charts to microfilm, while serving to effect very substantial economies in space for record purposes, does not lend itself readily to inspection for frequent use. This is especially true where the data is of the kind involving a great deal of tabulation of figures in rows and columns, the inspection of which ordinarily even on record size must be exercised with considerable care.

Where transposition is made of the tabularized matter or charts to microfilm records, the identification and selection of this data is far more awkward than the inspection of the text from which these microfilm records were produced.

I have found that the filming of tabularized data, which is ordinarily arranged upon charts in rows and columns, and which has some progressive relationship numerically, lends itself to recording upon microfilm of indeterminate length, but that when employed in microfilm the task of viewing this tabularized data is exceedingly arduous.

Accordingly, it is an object of my invention to provide a machine to handle microfilm, which in addition to the usual magnified projection means affords opportunity for inspection quickly and facilely including the isolation of fragmentary portions of what ordinarily may be regarded as a frame of a film in which the spacial position of columnar data as the film is moved is availed of to simplify the inspection and reading of columnar data.

Still further, it is an object of my invention to provide a device for viewing microfilm in which a projected portion of a frame may be masked, including novel masking means wherein inspection of predetermined portions of columnar data may be quickly and accurately accomplished.

Still further, it is an object of my invention to provide a film viewer where power driving of the film is effected to feed the film to expose selected data and project the same upon a viewing panel, including novel means for masking the projected image whereby a fragment of the film such as columnar data may be selectively viewed, including further means to mask selected impressions of the columns whereby tabularized data may be quickly and facilely inspected.

Still further, the object of my invention resides in the provision of a microfilm viewer for the inspection of tabularized data to simplify and accelerate the procurement of data in modern business methods, particularly available for simplifying and accelerating the work of making up pay-rolls under the intricate present-day requirements of calculating employees' taxes, deductions and the like.

Still more particularly, it is an object of my invention to provide a business machine where tabularized data is recorded upon microfilm and to accelerate and facilitate the inspection of data so recorded.

To achieve these objects and such further objects as may appear herein or be hereinafter pointed out, I make reference to the accompanying drawing forming a part hereof, in which Figure 1 is a perspective view of my device;

Figure 3 is a diagrammatic perspective view of a portion of the controlled mechanism.

Figure 4 is a magnified fragmentary sectional view transverse of the assembly.

Figure 5 is a fragmentary plan view of the panel base.

Figure 6 is a rear view of the panel base with portions broken away to show details.

Figure 7 is a section taken on the line 7—7 of Figure 5.

Figure 8 is a fragmentary portion of a chart to be reproduced on the microfilm.

Figure 9 is a diagrammatic wiring diagram of the electrical system of the illuminating and motor control.

Figure 1:
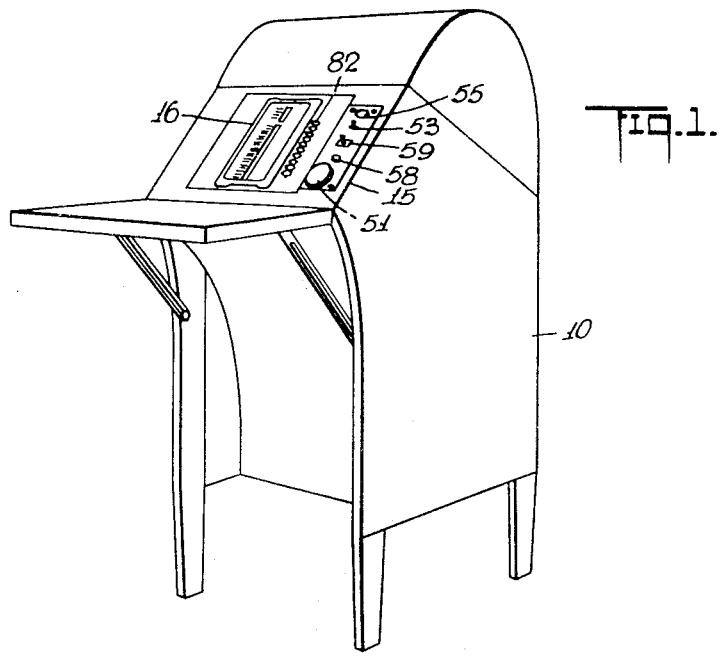
Figure 2:
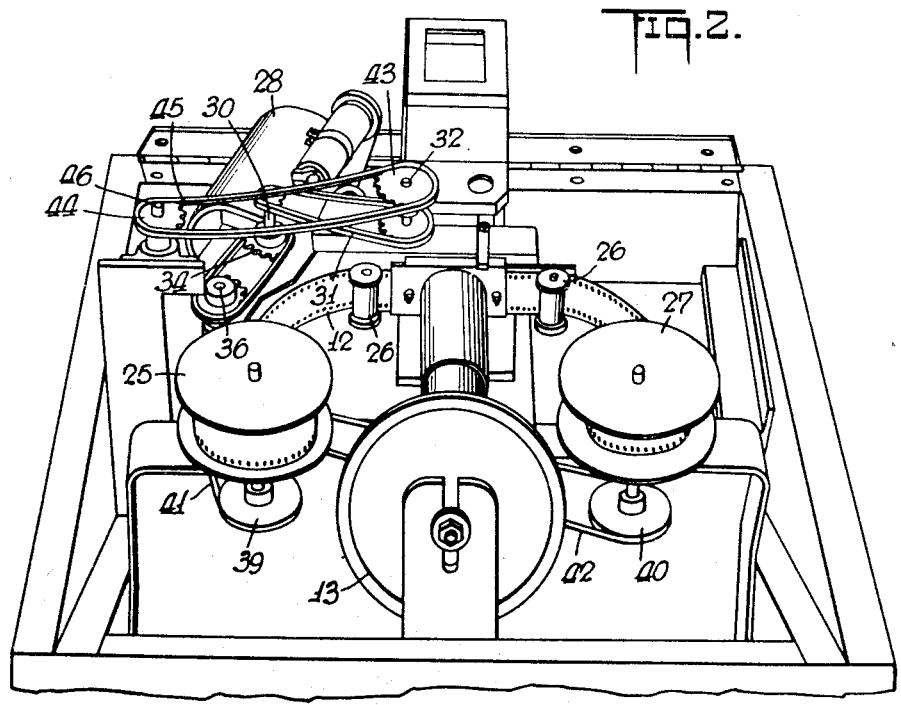
Figure 2 is a magnified fragmentary perspective view of my device with the hood of the device removed to display a portion of the interior mechanism.

Making reference to the drawing, it is contemplated by my invention as one exemplification thereof to provide a business machine which will facilitate the making out of payroll figures. Labor in connection with this type of bookkeeping under present day standards is quite complex. Payroll calculations may include, for example, a rate per hour calculation, social security deduction, withholding tax deduction. Other illustrations of calculations which might be required need not be here amplified.

As an illustration of fulfilling present day requirements I will refer to my device as applicable to a business machine which requires that the payroll clerk secure for the employee a payroll figure based upon (1) Hours at work per week;
(2) The rate per hour;
(3) The amount so earned;
(4) The Social Security;
(5) The withholding tax;
(6) The actual amount of the check or money in the envelope.

With differing rates of pay per hour, and differing categories of tax, the accountant may make out a series of charts for the bookkeeper or payroll clerk to make up. The handling of such charts is fraught with error apart from the labor of handling, and the tedium accompanying the transposition of the eye from column to column and from row to row.

For this purpose in the drawing, there is shown my device 10, comprising a cabinet mounted on a suitable standard, which includes a projector 11 for handling microfilm 12. An illustrative arrangement of the data on the microfilm 12 is shown in a fragment of the microfilm 12, Figure 8, details of which will be referred to hereafter.

The projector for the film 12 includes means for directing the image of the film onto the mirror 13, which in turn is reflected onto the mirror 14, to direct the image from the projector onto the panel 15, in magnified form.

The panel 15 includes a frame 16, which supports a translucent sheet 17, such as ground glass, so that the reflected image on the rear of the panel 15 may be viewed from the front face of the panel 15, in a manner which will be described in greater detail hereafter.

I will now refer to the film feed mechanism for feeding the microfilm 12 through the film gate 12a of the projector.

It is contemplated by me to transfer the details of tabularized charts on microfilm, thereby not only effecting now well recognized economies in space but likewise arranging the tabulated data in a continuous strip of film so that it may run seriatim from some low value to a high value, requiring scanning or inspection of a cross section or segment of the continuous strip to locate the desired data.

In the example shown in Figure 8, I illustrate tabularized data useful in connection with making out payrolls. The fragment shows an indicium 18 at the top, indicating the number of hours of labor to be calculated. Indicium 19 indicates the rate per hour to be paid. Indicium 20 in each column 21 provides a calculation which is the product of the hours and the rate per hour. Additional rows then indicate such desirable tabularized data as social security premium by indicium 22, withholding tax by indicium 23, and the ultimate figure by indicium 24, which the employee is to find in his pay envelope, after the various necessary calculations and adjustments have been made.

Since there may be various types of deductions or calculations such as under the withholding tax, the chart in each column has data in accordance with the different types of readings for withholding taxes, for labor having exemptions, or classifications warranting a different tax rate.

It is contemplated by me that the various columns 21 shall have the tabularized data arranged thereon in some progressive numerical relationship. Thus, the chart in connection with the illustration is shown with calculations for the hours worked as forty hours per week, it being understood that the strip may start with a series of calculations for a much lower number of hours and progress to a much greater number of hours.

I have devised mechanism for viewing of a section of the strip 12, thereby viewing only a column and then further make possible the selection of data in each column, thereby isolating on the viewing screen in magnified form, fragmentary portions of what would ordinarily be regarded as a frame of the film, simplifying the location of the desired data.

To effect this isolation of fragmentary portions of the film, to view isolated columns of data projected upon the panel 15, with a speed and precision not possible in handling tabulated data on charts, I will now refer to the film feed control mechanism.

In Figure 3 I have shown diagrammatically the control mechanism for the film feed, excluding the projector parts for convenience. The film 12 may feed from the reel 25, over the guides 26 to the take-up roll 27. Positive drive of the film is effected by the motor 28, which, through the mitre gears 29, the shaft 30, and the belt 31, drives the shaft 32 on which the sprocket wheel 33 is mounted, entering the usual sprocket holes of the film 12. The shaft 30 has a pulley 34 which, by the belt 35, drives the shaft 36. Pulleys 37 and 38 are used to drive the pulleys 39 and 40, respectively, through the belts 41 and 42. Thus, forward or reverse movement of the motor 28 serves to feed the film 12 through the sprocket wheel 33, through the film gate 12a, previously mentioned, with frictional drive of the reels 25 and 27.

Manual means may be employed to move the film 12 and for this purpose the shaft 32, through the pulleys 43 and 44, are coupled with the belt 45 to operate the shaft 46, which may be turned by the mitre gear 47, when the pinion 48 on the shaft 49 is pushed into engagement with the mitre gear 47, against the spring 50, upon operation of the knob 51 on the front of the panel 15. Thus, normally the pinion 48 is held out of engagement with the mitre gear 47, but the latter may be turned upon bringing the same into engagement therewith, when the knob 51 is depressed and turned.

The relationship of the film feed to the control panel will be more readily understood by reference to the wiring diagram in Figure 9, wherein the motor 28 is connected by conductors 52 to the source of power, and controlled by a starting switch 53. The lamp 54 of the projector 11 and the tell-tale lamp 55, visible on the panel, are connected in parallel by the conductors 56 and 57. One of the conductors 52 connected with the motor is provided with a push button switch 58, accessible on the panel for closing or opening the motor circuit as long as the hand actuates the push button.

A reversing switch 59 may serve to wind the film or reverse the direction of rotation of the motor 28, thereby to feed the film 12 at will in either direction, depending upon the throw of the toggle switch finger, in a manner readily understood.

I will now refer to the details of construction of the panel 15 whereby the image projected upon the translucent screen 17 as a full frame of the projector may be used to view a fragment of the film so framed, such as a columnar portion thereof, with means to selectively view a portion or row of the column.

For this purpose, the panel 15 is provided with an upper apertured portion 60, thereby masking from the translucent screen 17 all but a portion of the image, which will make visible a portion of the column for viewing, for example indicia 18, 19, 20 and 22. A mask 61, having a coincident aperture 62, is covered by a transparent shield or cover glass 63, all held within the frame 16.

A lower aperture 64 corresponding to indicia 23, 24 is covered by a selector assembly 65. This comprises a guide plate 66, affixed by the fastening means 67 to the rear face of the panel 15. Sliders 68 are guided between the rear face of the panel 15 and the guide plate 66. Each of the sliders 68 abuts the other sidewise so that the group in side by side contact completely obscures the aperture 64 unless one of the sliders 68 is withdrawn, thereby to expose a portion of the screen 17.

In the embodiment illustrated in Figures 6 and 7, the sliders are shown to have slidable movement from a point where the outer edge abuts the edge of the plate 69 or to the position where the edge 68a exposes the screen through the apertures 64.

The number of sliders is extended to cover the various items in the columns. In the illustrations shown, wherein a payroll indicator is illustrated, I have shown ten different sliders, to correspond to ten different types of withholding tax calculations.

On the front face of the mask 61 I may provide rows of indicia 70, which will identify the elements in each of the columns.

Each slider on its rear face has an extension arm 71, including an ear 72, engaged by a link 73 connected with a collar 74, rotatably mounted on the shaft 75, positioned between the end plates 76. Each collar has an extension arm 77 engaged in the groove 78 in each one of the plungers 79. Each of the plungers has guides 80 and 81, respectively, at its opposite ends. Each guide 80 extends through an orifice or guiding slot in the panel 15 and is provided with an identifying push button 82. The guides 81 are enveloped by an expansion spring 83 between the end brace 84 formed with a slot to receive the guide 81 and the shoulder 85, normally to project the exposed push button outwardly and thereby project the correspondingly connected slider in a covering position. Shoulders 86 restrain the plungers in the limiting outward position.

Each of the plungers is provided with a latching notch 87 and a camming notch 88. A single pawl 89, pivoted in the pintle holes 90, lies adjacent one side of the bank of plungers 79, each provided with the latching notch 87, so that the lip 91 is urged into latching or camming position by the leaf spring 92, anchored at one end 93 in the end brace 84 and having its opposite end 94 bearing against the pawl 89.

By this arrangement, depression of a single push button causes the plunger thereof 79 to be held in the down position shown in dotted lines in Figure 7, by engagement of the pawl 89 with the latching notch 87. Upon depressing any other push button, the camming notch 88 of the selected push button first trips the pawl from engagement with the previously depressed plunger, releasing the same by spring action to the normally projected position. Continued downward movement under pressure causes the selected push button then to be held in its depressed condition. This action serves to move a slide to an unmasking position, while releasing a previously depressed button, to move its slider to the covering position.

In this manner it will be observed that depression of any one of the buttons 82 will leave available for exposure the illumination of the screen for any row of a column that may correspond to the type of tax on the tabulated data.

With the mechanism thus far described, I will indicate the operation of my viewer. The motor may be connected with a source of power by the setting or closing of the starting switch 53, which action serves to provide power for the lamp 54 and the tell-tale lamp 55. Forward movement may then be imparted to the film 12 by the toggle switch 59. Thereupon the push button 58 is depressed, putting the motor into operation forwardly or in reverse, dependent upon the switch 59.

The push button may be held down for rapid movement of the film or given momentary contact for momentary movement of the film as the proper indicium 18 at the head of each column appears on the screen and may be viewed by the operator through the aperture 60. Manual intermediate setting may be effected by the knob 51, to shift the film back or forth for one or two columns, as the operator may find desirable, in order to expose the proper column to view. When the proper column has been exposed, the operator may then press down any one of the push buttons 82 to expose the ultimate figure to be found, in accordance with the type of tax as in this particular illustration.

It will be seen that by the installation which I have provided, data on the microfilm may be enlarged upon the screen for rapid inspection, the film being movable with power driven mechanism at high speed from one position to another, at the will of the operator. Delicate control may be secured by manual operation. Rapid determination of the sought-for figure may be secured by depressing the buttons 82 controlling the exposure of data in a selected row of the column.

In this manner, intricate data may be arranged on microfilm and the desired data may be rapidly located.

There is also provided means for magnification of the data on the microfilm, projection of selected portions thereof on a screen, and by arranging the tubularized data seriatim on the film, I may move the film in either direction with great rapidity to the approximate location desired for inspection, and quickly, by manual control, secure the desired data from a column and row.

It will also be observed that I have provided novel and compact apparatus whereby microfilm material may be inspected and viewed, projecting substantially a film frame of the microfilm for proper magnification and scanning a fragmentary portion thereof, to inspect columnar data carried thereby by use of the masking panel and intermediate masks for rows of each column. It will also be observed that I have provided a compact microfilm viewer which lends itself readily to simplification of inspection of this form of record or tabularized data.

It will be observed that while I attribute novelty to the entire assembly, I do not intend to be limited thereto and that isolated features thereof may have novelty, as outlined in the appended claims.

By "microfilm" as used herein, I intend to refer to film carrying records which are microphotographically reproduced thereon.

Having thus described my invention and illustrated its use, what I claim as new and desire to secure by Letters Patent, is:

1. In a device for projecting and viewing film, the combination comprising microfilm having imposed thereon, transversely of the film, columnar data, each of the columns thereof being arranged seriatim along the length of the film, means for projecting a framed section of said film upon one face of a viewing screen, screen mounting means and underlying guides contiguous therewith having in the plane of the screen masking means including guides therefor adjacent said screen for a transverse portion of said framed section, and graphic indicia means on said opposite face, whereby a limited transverse portion may be viewed on the opposite face in combination with said last-mentioned graphic indicia means.

2. In a device for projecting and viewing microfilm, including a projector for projecting a predeterminedly framed portion of the film, the combination comprising microfilm having imposed thereon transversely of the film, columnar data, each of which columns thereof being arranged seriatim along the length of the film, a translucent screen and means for directing the image projected from said projector upon the rear face of the screen in magnified form to be viewable from the front face of the screen, means in the plane of the screen for masking the screen to limit the viewing of the image on the screen to a columnar portion, sliders cooperating with said masking means to mask predetermined spacial positions of the columnar portion projection on said screen, and means for moving said sliders to unmask the screen in predetermined spacial positions of said image of said column and indicia means on the front face of the screen positioned to identify the isolated portion projected on the rear face of the screen and visible on the front face thereof.

3. In a device for projecting a viewing microfilm, a projector for projecting a framed section of said film as a magnified image thereof, the combination comprising microfilm having imposed thereon, transversely of the film, columnar data, each of the columns thereof being arranged seriatim along the length of the film, a translucent screen, means for projecting substantially a predetermined framed section of said film upon the rear face of the screen in magnified form whereby the image may be viewed from the front face of said screen, a masking panel in the plane of the screen whereby a predetermined columnar segment may be viewed on the screen, portions of said masking panel constituting independently operable sliders having predetermined spacial positions with respect to the image of the column viewable on said screen, selectively to mask or unmask the image of the column projected on said screen and indicia means on the front face of the screen positioned to identify the isolated portion projected on the rear face of the screen and visable on the front face thereof.

4. In a device for projecting and viewing microfilm, the combination comprising microfilm, having imposed thereon transversely of the film, columnar data, each of the columns thereof arranged seriatim along the length of the film, a translucent screen, means for projecting a magnified transverse section of said film upon the translucent viewing screen to illuminate the rear surface thereof, and make viewable an image on the front face of the screen, masking means adjacent one face of said screen and substantially in the plane thereof to make visible on said screen a transverse section of said image and an assembly of independently operable sliders adjacent to said masking means for masking predetermined spacial positions of said screen, and operating means for independently actuating said sliders and indicia means on the front face of the screen positioned to identify the isolated portion projected on the rear face of the screen and visible on the front face thereof.

5. In a device for projecting and viewing microfilm wherein said microfilm has imposed thereon transversely of the film columnar data, each of the columns thereof being arranged seriatim along the length of the film, a projector, a translucent screen, means for projecting a framed section of said film upon the rear face of the screen, a plurality of guides corresponding to a number of the columns and similarly positioned for obliterating portions of the image from view from the front face of the screen, control means manually operable from the front of the screen to mask or unmask predetermined portions of said screen, and graphic indicia means on the front face of the screen to identify the unmasked portions.

ALVIN G. HERRMANN.

REFERENCES CITED

The following references are of record in the file of this patent:

UNITED STATES PATENTS

| Number | Name | Date |
|---|---|---|
| 1,133,311 | Newcomb | Mar. 30, 1915 |
| 1,218,979 | Cahill | Mar. 13, 1917 |
| 1,646,855 | Del Ricco | Oct. 25, 1927 |
| 1,889,575 | Sebille | Nov. 29, 1932 |
| 1,900,651 | Koenig et al. | Mar. 7, 1933 |
| 2,265,859 | Rinaldy | Dec. 9, 1941 |
| 2,285,644 | Bernzott | June 9, 1942 |
| 2,323,372 | Bryce | July 6, 1943 |
| 2,357,593 | Leavell | Sept. 5, 1944 |
| 2,369,284 | Dale | Feb. 13, 1945 |
| 2,379,534 | Lowden | July 3, 1945 |